United States Patent [19]

Holtrop et al.

[11] Patent Number: 4,608,104

[45] Date of Patent: Aug. 26, 1986

[54] METHOD OF MAKING A THERMOFORMABLE LAMINATE STRUCTURE

[75] Inventors: James S. Holtrop, South Windsor, Conn.; Richard P. Maurer, Wilbraham, Mass.

[73] Assignee: Monsanto Company, St. Louis, Mo.

[21] Appl. No.: 755,240

[22] Filed: Jul. 13, 1985

Related U.S. Application Data

[60] Division of Ser. No. 648,547, Sep. 7, 1984, Pat. No. 4,529,641, which is a continuation-in-part of Ser. No. 553,462, Nov. 17, 1983, Pat. No. 4,489,126.

[51] Int. Cl.⁴ .......................... B32B 31/16; B32B 5/32
[52] U.S. Cl. ...................................... 156/78; 156/145; 156/156; 156/291; 156/292; 428/198; 428/246; 428/286; 428/288; 428/296; 428/316.6; 428/317.1; 428/319.3; 428/319.7

[58] Field of Search ................. 156/78, 145, 156, 291, 156/292, 79; 428/198, 246, 286, 288, 296, 316.6, 317.1, 319.3, 319.7

[56] References Cited

U.S. PATENT DOCUMENTS

| | | | |
|---|---|---|---|
| 3,817,803 | 6/1974 | Horsky | 156/145 X |
| 4,039,363 | 8/1977 | Robertson | 156/145 |
| 4,132,577 | 1/1979 | Wintermantel | 156/156 |
| 4,262,046 | 4/1981 | Eitel | 156/145 X |
| 4,476,183 | 10/1984 | Holtrop et al. | 156/78 X |

Primary Examiner—Robert A. Dawson
Attorney, Agent, or Firm—Lawrence L. Limpus; Thomas E. Kelley

[57] ABSTRACT

A twin-sheet thermoformable laminate structure is provided which has two layers of foamed thermoplastic material. A coating of a fabric impregnated with an acrylic resin having a softening temperature greater than 75° C. is applied to at least the outer surface of each layer of thermoplastic material.

3 Claims, 2 Drawing Figures

METHOD OF MAKING A THERMOFORMABLE LAMINATE STRUCTURE

This is a division of application Ser. No. 648,547, filed Sept. 7, 1984, now U.S. Pat. No. 4,529,641, which is in turn a continuation in part of application Ser. No. 553,462, filed Nov. 17, 1983, now Pat. No. 4,489,126, both incorporated herein by reference.

This invention relates to thermoplastic materials, and particularly to a thermoformable laminate structure comprising two foamed thermoplastic layers. More particularly this invention relates to a moisture-resistant, thermoformable laminate structure which may be molded into complex shapes by twin sheet thermoforming. More particularly this invention relates to a thermoformable laminate structure having a coating formed from a fabric which is impregnated with an polymeric resin which has a high softening temperature.

DESCRIPTION OF THE PRIOR ART

Foamed thermoplastic laminates have been used for many years. These laminates were most often formed as a sandwich structure in which the foamed thermoplastic material was enclosed between liner board facings. An example of this construction is a polystyrene foam sheet which has a kraft liner board facing on each side. This laminate has been used by die-cutting and scoring or by pressing the board and applying a resin to fix the pressed shape. However, the kraft liner board facing is a paper material which is not easily molded and which has a tendency to wrinkle during any molding of the laminate structure.

Other efforts have been made to provide a laminate structure which may more easily be molded. A thermoplastic laminate has been formed of a layer of foamed styrene-maleic anhydride polymer to which a thermoplastic polymer skin is bonded. This laminate is moldable without the problems caused by the earlier developed paper facings.

More recent efforts have provided laminate structures formed of molded fiberglass which contains a phenol-formaldehyde polymer as a binder. A rayon scrim is attached to one side of a fiberglass batt and is compression molded to the desired shape.

SUMMARY OF THE INVENTION

This invention provides a moisture-resistant, moldable, thermoformable laminate structure comprising two layers of foamed thermoplastic material having polymer-impregnated fabric bonded to at least the outer surfaces thereof. The laminate structure of this invention can be twin sheet thermoformed into a hollow laminate structure.

DESCRIPTION OF PREFERRED EMBODIMENTS

Figure 1:
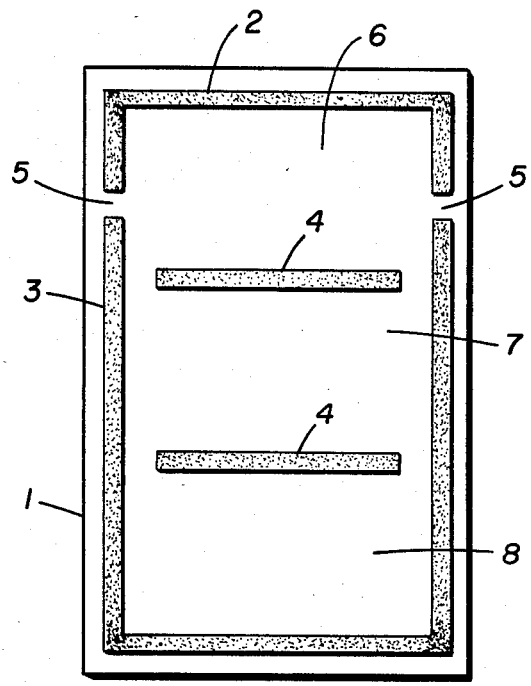
FIG. 1 schematically illustrates an adhesive registration pattern between layers of foamed thermoplastic material to facilitate twin-sheet thermoforming.

The moisture-resistant, moldable, thermoformable laminate structure of this invention has two layers of foamed thermoplastic material which have inner and outer surfaces. The layers of thermoplastic material are preferably layers of foamed polystyrene; however, other foamed thermoplastic materials such as foamed styrene-maleic anhydride polymer, foamed styrene-acrylonitrile polymer, foamed polyethylene and other similar materials may also be used. While there are no limits on the thickness of a layer of foamed thermoplastic material, the thickness is usually limited to that which is easily laminated. The thickness of the layer of thermoplastic material used in this invention, will generally be less than 30 millimeters and it is preferred that the thickness of the layer of foamed thermoplastic material be between 2.0 and 20.0 millimeters.

A coating comprising a polymer-impregnated fabric is bonded to at least the outer surfaces of the foamed thermoplastic material. The polymer-impregnated fabric provides stability to the laminate, for instance a composite laminate, which has been thermoformed into a complex shape at thermoforming temperatures in the range of 130° C. to 180° C. Such thermoforming temperature range is limited at the lower temperature of 130° C., the temperature at which the foamed thermoplastic sheet is readily thermoformable. This range is limited at the higher temperature of 180° C. by the foam collapse temperature of the material of the foamed thermoplastic sheet. Accordingly the upper limit of the thermoforming temperature range depends on the foamed thermoplastic material utilized. Temperatures of up to about 180° C. are satisfactory for molding laminates using foam comprising styrene-maleic anhydride copolymers. However the upper temperature limit for thermoforming laminates using foam comprising polystyrene is about 150° C.

The fabric which provides support for the polymer being applied to the surface of the thermoplastic layer may be a woven fabric, a non-woven fabric or a non-woven, spunbonded fabric. The fabric can comprise a variety of textile structures for instance the fabric may be woven or non-woven. A desired characteristic of the fabric is that it elongates sufficiently in a direction in its surface to conform to the desired complex shape to be imparted by the thermoforming process. Desirable fabric will elongate, for instance in the range of about 10–50 percent, at thermoforming temperature without destroying integrity of the fabric structure. Woven fabric of natural or glass fibers generally exhibit elongation of less than 10 percent. Preferred fabric which can undergo such elongation comprises non-woven fabric such as non-woven spunbonded polyester fabric. Other fabric which may be useful include non-woven polyester, non-woven nylon and non-woven polypropylene. The fabric can have any thickness which may be desired. Typically useful fabric will have a thickness in the range of 0.05 to 1.0 millimeters. However, fabric having a larger thickness may be used. Preferably fabric will be non-woven and have a thickness of from 0.1 to 0.4 millimeters. Typically useful cloth will also have a basis weight in the range of 0.3 to 10.0 ounces per square yard (10–340 grams per square meter), preferably in the range of 1.0 to 6.0 ounces per square yard (34–203 grams per square meter).

For purposes of this invention the term "softening temperature" is intended to mean softening point as determined by thermomechanical analysis using a program designated "TADS TMS STD TEV01.04 PCN 05.06B01.01.04" provided by Perkin Elmer using a Perkin Elmer Model TMS2, Thermomechanical Analyzer. Analytical parameters were: probe load: 10 grams; minimum temperature: 25° C.; maximum temperature: 200° C.; heating rate: 5° C. per minute; cooling rate: 20° C. per minute; penetration probe: round tip. Polymer samples were approximately ¼ inch×⅛ inch×1/16 inch (6.35 mm×3.18 mm×1.6 mm). Thermomechanical analysis comprises placing a weighted compression probe on a thin sample which is slowly heated at a uniform rate. The temperature at which the probe begins to penetrate the sample is the softening point which is determined by the intersection of tangent lines about the inflection point on the plot of penetration distance versus temperature near the temperature at which the probe begins to penetrate the sample. Polymers useful in the process of this invention will have a softening temperature greater than 75° C. but lower than the minimum thermoforming temperature of the foamed thermoplastic material, for instance about 130° C. or up to about 180° C.

The polymer used to impregnate the fabric is preferably an acrylic resin having a high softening temperature, that is, a softening temperature greater than approximately 75° C. Other polymers such as a phenolic resin may also be used. When a phenolic resin is used instead of the preferred acrylic resin the fabrication process must be modified to prevent a complete cure of the phenolic resin before the laminate structure is molded into the desired final shape. When the phenolic resin is completely cured it is no longer moldable; thus, during the preparation of the laminate structure, the phenolic resin impregnated fabric must be only partially cured. It must remain partially cured until the final molding step. The use of an acrylic resin, which is preferred, eliminates the handling problems such as storage to prevent curing and emission of volatile materials which are associated with the use of a phenolic resin.

Desirable soluble acrylic polymers include those polymers which are designated in commerce as resins. Acrylic polymers that are soluble in liquids such as water and lower alcohols such as methanol, ethanol, N-propanol, etc. are preferred. The most preferred acrylic resins are those which are soluble in water, for instance solutions of water and ammonia. Such resins include styrene-methacrylic acid copolymers. Such acrylic resins must also of course exhibit a softening temperature greater than about 75° C. One such acrylic resin which is soluble in a water-ammonia solution, available from S. C. Johnson & Son, Inc., is Joncryl 678 acrylic resin which has a softening temperature of about 89° C. Such high softening temperature also allows for a stable laminate especially for uses where local temperatures may become moderately high. The polymer-impregnated fabric can be prepared by soaking the fabric in a solution of polymer and solvent, for instance fabric can be pulled through a vat of a solution and then through a set of rolls to remove excess solution. The fabric can be dried to remove excess solvent and then adhered to one side of the foamed thermoplastic sheet. The adhesion can be effected by any adhesive that will bond that polymer-impregnated fabric to the foamed thermoplastic sheet. The coating is bonded to one surface of the foamed thermoplastic material by pressure and heat treatment laminating.

Alternatively the thermoformable laminate of this invention can be prepared by applying an acrylic polymer emulsion film to the foamed thermoplastic sheet. A cloth can then be adhered to the wet acrylic polymer emulsion film. This acrylic polymer emulsion film method is generally more economical in that substantially lower quantities of polymer are required to form a laminate. For instance, it has been found that less than 16 grams (for instance, about 5 to 8 grams) of polymer is required per square meter of laminate by this alternative polymer emulsion film method. On the other hand it has been generally found that about 40.0 grams of polymer are utilized per square meter of laminate when the fabric is soaked in a polymer solution. A suitable polymer emulsion may contain an adhesive to promote adhesion of the polymer emulsion film to the foamed thermoplastic sheet. Such adhesive can comprise an acrylic adhesive such as is available from Rohn and Haas as E2138 acrylic adhesive or E1958 acrylic adhesive. Such adhesive can be mixed, for instance, in equal volumetric proportions, with the acrylic emulsion, for instance Joncryl 89 styrenated acrylic dispersion (available from S. C. Johnson & Son, Inc.), a water based emulsion of about 48 percent by weight acrylic solids having a softening temperature of about 101° C.

The fabric can be laid over the dried polymer emulsion film. The composite of fabric, polymer emulsion film and foamed thermoplastic sheet can then be laminated by the application of heat and pressure to force the softened polymer film to penetrate the fabric. For instance a hot surface having a temperature of about 120° to 150° C. can be pressed on the fabric to cause the softened acrylic polymer film to penetrate into and impregnate the fabric.

The laminate structure of this invention is fabricated by preparing two separate layers of foamed thermoplastic material having a coating of a polymer-impregnated fabric adhered to at least one surface. These layers are adhered together with the surfaces having the polymer-impregnated fabric on the outside when there is coating on one surface only. It is also possible to provide the foamed thermoplastic with a coating on both surfaces.

The layers can be adhered with an adhesive on a majority of the facing inner surfaces, for instance on the entire inner surfaces. Alternatively the layers can be adhered with adhesive on a minor portion of the facing inner surfaces, for instance in a pattern to allow twin-sheet thermoforming. Such a pattern is illustrated in FIG. 1 where inner face 1 of a layer of foamed thermoplastic material has adhesive in a pattern where layer of adhesive 3 circumscribes a major portion of the periphery and layer of adhesive 2 circumscribes a minor portion of the periphery allowing void portions 5 which can accommodate blow pins inserted between two adhered layers of foamed thermoplastic material. Adhesive layers 4 provide other points of adhesive contact betweem two layers of foamed thermoplastic material. Portions 6, 7 and 8 of the inner surfaces of the two layers have no adhesive which will allow them to expand during twin-sheet thermoforming.

Figure 2:
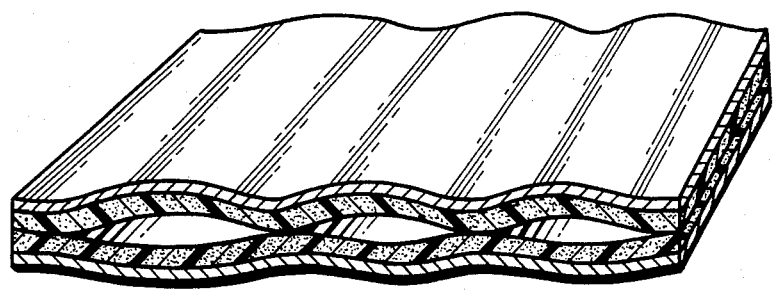
FIG. 2 schematically illustrates a cross sectional view of a twin-sheet thermoformed laminate structure of this invention.

To effect twin-sheet thermoforming two layers of foamed thermoplastic sheet are arranged with a coating of polymer-impregnated fabric on at least the outer surfaces and with adhesive in a registration pattern on the inner surface of at least one layer. At least one blow pin is inserted between the layers, preferably at a location devoid of adhesive to facilitate later removal of the blow pin. The layer can be heated to soften the adhesive prior to lamination in a press. The laminated layers are then preheated to soften the foamed thermoplastic material and the polymer-impregnated in the fabric coating. The preheated laminate is then inserted into a thermoformer where a source of pressured gas, for instance air, is connected to the blow pin and mold blocks close on to those portions of the laminate to be adhered between the two layers of foamed thermoplastic. The mold can shape the laminate into a three-dimensional shape which is hollow at certain locations within its periphery, as illustrated in the cross-sectional view of FIG. 2.

In some instances it is also advantageous to apply vacuum to the mold cavities to assist in expanding non-adhered sections of the foamed thermoplastic.

The molds are cooled for instance with refrigerated water. To expedite cooling carbon dioxide can be introduced inside the hollow object through the blow pin.

Twin-sheet thermoforming can also be effected with two layers of foamed thermoplastic sheets with no adhesive between inner surfaces. In such case the heat provided during the thermoforming process can cause adhesion between the sheet by allowing polymer material to fuse at points of contact.

It may also be desirable during some twin-sheet thermoforming processes to provide a foam material into hollow volumes between expanded portions of sheets. For instance, it is possible to inject urethane foam precursor between the sheets through blow pins inserted between the sheets during the twin-sheet thermoforming.

A number of useful articles can be fabricated by twin-sheet thermoforming using the laminate structure of this invention. For instance an automobile headliner with improved accoustic properties can be fabricated where the headliner is hollow in the locations between roof support ribs and formed to closely conform to the interior surface of the automobile.

While specific embodiments of the invention have been described, it should be apparent to those skilled in the art that various modifications can be made without departing from the true spirit and scope of the invention. Accordingly, it is intended that the scope of the following claims cover all such modifications which will fall within the full inventive concept.

We claim:

1. A method of forming a laminate structure comprising at least two layers of foamed thermoplastic material having at least one cavity between said layers, said method comprising:
   (a) providing at least two layers of foamed thermoplastic material, said layer having inner and outer surfaces and having a polymer-impregnated fabric bonded to at least one surface of each of said layers, wherein adhesive is applied in a registration pattern on the surface of one of said layers adjacent to another of said layers,
   (b) providing a blow pin between said layers at a location devoid of adhesive,
   (c) laminating said at least two layers of foamed thermoplastic material together,
   (d) heating said layers to a thermoforming temperature, and
   (e) thermoforming said layers while applying pressurized gas to said blow pin to expand the volume between said layers at locations devoid of adhesive.

2. The method of claim 1 further comprising cooling said laminate structure by introducing carbon dioxide through said blow pins.

3. The method of claim 2 wherein a foam material is injected through said blow pins into the expanded volume between said layers.

* * * * *